United States Patent
Pan (10) Patent No.: US 11,405,799 B2
(45) Date of Patent: Aug. 2, 2022

(54) WIRELESS ROUTER DEPLOYMENT METHOD AND DEVICE, STORAGE MEDIUM AND ELECTRONIC APPARATUS

(71) Applicant: BOE TECHNOLOGY GROUP CO., LTD., Beijing (CN)

(72) Inventor: Tingting Pan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 75 days.

(21) Appl. No.: 16/980,488

(22) PCT Filed: Feb. 17, 2020

(86) PCT No.: PCT/CN2020/075521
§ 371 (c)(1),
(2) Date: Sep. 14, 2020

(87) PCT Pub. No.: WO2020/192306
PCT Pub. Date: Oct. 1, 2020

(65) Prior Publication Data
US 2021/0274355 A1 Sep. 2, 2021

(30) Foreign Application Priority Data
Mar. 25, 2019 (CN) .......................... 201910228534.2

(51) Int. Cl.
*H04W 16/18* (2009.01)
*H04W 24/08* (2009.01)
*H04W 64/00* (2009.01)

(52) U.S. Cl.
CPC ........... *H04W 16/18* (2013.01); *H04W 24/08* (2013.01); *H04W 64/003* (2013.01)

(58) Field of Classification Search
CPC ..... H04W 88/10; H04W 64/00; H04W 24/00; H04W 64/003; H04W 88/14;
(Continued)

(56) References Cited

U.S. PATENT DOCUMENTS

| 9,648,506 | B2 | 5/2017 | Geller et al. |
| 10,368,227 | B2 | 7/2019 | Geller et al. |

(Continued)

FOREIGN PATENT DOCUMENTS

| CN | 101453738 A | 6/2009 |
| CN | 101453738 B | 8/2010 |

(Continued)

OTHER PUBLICATIONS

International Search Report and Written Opinion for International Application No. PCT/CN2020/075521 dated Apr. 28, 2020.
(Continued)

*Primary Examiner* — Jung Liu
(74) *Attorney, Agent, or Firm* — Perilla Knox & Hildebrandt LLP; Kenneth A. Knox (57) ABSTRACT

A wireless router deployment method for determining deployment positions of wireless routers in a spatial area includes: acquiring first position information on a plurality of candidate nodes distributed in the spatial area for deploying the wireless routers; determining, based on the first position information, a network coverage probability and a network energy efficiency value for each of the candidate nodes presuming a to-be-deployed wireless router is deployed at the candidate node; determining network quality scores for respective candidate nodes according to the network coverage probability and the network energy efficiency value; and selecting a candidate node with the highest network quality score as a deployment position for the to-be-deployed wireless router.

18 Claims, 6 Drawing Sheets

(58) Field of Classification Search
CPC ... H04W 52/0235; H04W 76/10; H04W 8/22; H04W 28/18; H04W 8/245; H04W 40/22; H04W 40/24; H04W 40/242; H04W 40/248; H04W 50/46; H04W 88/04; G01S 5/0242; G01S 5/02; H04L 45/02; Y02D 30/70

See application file for complete search history.

(56) References Cited

U.S. PATENT DOCUMENTS

| | | | | |
|---|---|---|---|---|
| 2011/0032844 A1* | 2/2011 | Patel | ............ | H04W 88/14 370/255 |
| 2015/0215791 A1* | 7/2015 | Geller | ............ | H04L 43/16 455/446 |
| 2016/0135140 A1* | 5/2016 | Edge | ............ | H04L 67/18 455/456.1 |
| 2017/0223656 A1* | 8/2017 | Jeong | ............ | H04W 64/00 |
| 2017/0230813 A1* | 8/2017 | Geller | ............ | H04L 67/303 |
| 2017/0331670 A1* | 11/2017 | Parkvall | ............ | H04J 11/0079 |
| 2018/0375567 A1* | 12/2018 | Fan | ............ | H04B 7/2606 |
| 2020/0314683 A1* | 10/2020 | Imran | ............ | H04W 52/0245 |

FOREIGN PATENT DOCUMENTS

| | | |
|---|---|---|
| CN | 102547758 A | 7/2012 |
| CN | 103338504 A | 10/2013 |
| CN | 103415025 A | 11/2013 |
| CN | 104394537 A | 3/2015 |
| CN | 105634873 A | 6/2016 |
| CN | 106162668 A | 11/2016 |
| CN | 103415025 B | 12/2016 |
| CN | 109302715 A | 2/2019 |
| CN | 109743741 A | 5/2019 |
| JP | 2016208504 A | 12/2016 |

OTHER PUBLICATIONS

First Office Action for CN Patent Application No. 201910228534.2 dated Apr. 3, 2020.
Second Office Action for CN Patent Application No. 201910228534.2 dated Oct. 19, 2020.

* cited by examiner

Fig. 10

WIRELESS ROUTER DEPLOYMENT METHOD AND DEVICE, STORAGE MEDIUM AND ELECTRONIC APPARATUS

CROSS-REFERENCE TO RELATED APPLICATIONS

This application is a national phase application under 35 U.S.C. § 371 of International Patent Application No. PCT/CN2020/075521, filed on Feb. 17, 2020, which claims the benefit of and priority to Chinese Patent Application No. 201910228534.2, filed Mar. 25, 2019, the entire contents of both of which are incorporated herein by reference as a part of this application.

TECHNICAL FIELD

The present disclosure relates to the field of computer technology and, in particular, to a wireless router deployment method, a wireless router deployment device, a computer readable storage medium, and an electronic apparatus.

BACKGROUND

As requirements for wireless communication continue to increase, a wireless full coverage communication network in an office building has become an important form of daily communication for office workers. A wireless communication network in high-rise buildings is more complicated and dense, and router deployment therein becomes more irregular.

Irregular deployment of routers is not only difficult to ensure coverage of wireless network in an area, but also ineffectively monitors the communication quality of the entire area and, meanwhile, also leads to a waste of resources and funds in network communication equipment. Thus, it can be seen that optimizing the deployment of routers so as to improve the quality of network communication is an urgent problem to be solved.

It should be noted that the information disclosed in the background section above is only used to enhance the understanding of the background of the present disclosure and, therefore, may include information that does not constitute the prior art known to those of ordinary skill in the art.

SUMMARY

Objects of the present disclosure are to provide a wireless router deployment method, a wireless router deployment device, a computer readable storage medium, and an electronic apparatus.

According to one aspect of the present disclosure, there is provided a wireless router deployment method for determining deployment positions of wireless routers in one spatial area, the method including:

acquiring first position information on a plurality of candidate nodes distributed in the spatial area for deploying the wireless routers;

calculating, based on the first position information, a network coverage probability and a network energy efficiency value for each of the candidate nodes presuming a to-be-deployed wireless router is deployed at the candidate node;

calculating network quality scores for respective candidate nodes according to the network coverage probability and the network energy efficiency value; and selecting a candidate node with the highest network quality score as a deployment position for the to-be-deployed wireless router.

In one exemplary implementation of the present disclosure, the calculating network quality scores for respective candidate nodes according to the network coverage probability and the network energy efficiency value includes:

acquiring weight information on the network coverage probability and the network energy efficiency value; and weighted summing the network coverage probability and the network energy efficiency value based on the weight information to obtain the network quality scores for the respective candidate nodes.

In one exemplary implementation of the present disclosure, the calculating, based on the first position information, a network coverage probability and a network energy efficiency value for each of the candidate nodes presuming a to-be-deployed wireless router is deployed at the candidate node includes:

acquiring second position information on one or more user nodes distributed in the spatial area that are in network communication with a deployed wireless router;

selecting a temporary node from the plurality of candidate nodes, and calculating, based on the first position information and the second position information, the network coverage probability and the network energy efficiency value for the temporary node presuming the to-be-deployed wireless router is deployed at the temporary node; and continuing to select another temporary node from the plurality of candidate nodes and calculate the network coverage probability and the network energy efficiency value for the another temporary node presuming the to-be-deployed wireless router is deployed at the another temporary node, until all of the plurality of candidate nodes are selected and calculated.

In one exemplary implementation of the present disclosure, the user nodes are randomly distributed in the spatial area.

In one exemplary implementation of the present disclosure, the calculating, based on the first position information and the second position information, the network coverage probability and the network energy efficiency value for the temporary node presuming the to-be-deployed wireless router is deployed at the temporary node includes:

calculating, based on the first position information and the second position information, a signal to interference plus noise ratio (SINR) for the deployed wireless router presuming the to-be-deployed wireless router is deployed at the temporary node;

calculating, based on the SINR and a preset interference ratio threshold, the network coverage probability presuming the to-be-deployed wireless router is deployed at the temporary node;

calculating, based on the first position information and the second position information, a network capacity for the deployed wireless router presuming the to-be-deployed wireless router is deployed at the temporary node; and calculating, according to the network capacity and a number and a transmission power of the deployed wireless router, the network energy efficiency value presuming the to-be-deployed wireless router is deployed at the temporary node.

In one exemplary implementation of the present disclosure, the calculating, based on the first position information and the second position information, a network capacity for the deployed wireless router presuming the to-be-deployed wireless router is deployed at the temporary node includes:

calculating, based on the first position information and the second position information, a SINR for the deployed wireless router presuming the to-be-deployed wireless router is deployed at the temporary node;

acquiring a bandwidth and a number of subcarriers for the deployed wireless router; and calculating, according to the SINR, the bandwidth and the number of subcarriers, the network capacity for the deployed wireless router presuming the to-be-deployed wireless router is deployed at the temporary node.

In one exemplary implementation of the present disclosure, the acquiring of the first position information on the plurality of candidate nodes distributed in the spatial area for deploying the wireless routers includes:

dividing the spatial area into a plurality of uniformly distributed spatial grids;

using the spatial grids as the candidate nodes for deploying the wireless routers; and acquiring the first position information on each of the candidate nodes.

In one exemplary implementation of the present disclosure, the method further includes:

continuing to deploy another to-be-deployed wireless router in the spatial area and select a deployment position for the another to-be-deployed wireless router until the network coverage probability, the network energy efficiency value, and/or network quality score meet a preset condition.

In one exemplary implementation of the present disclosure, the preset condition includes:

the network coverage probability being greater than a first preset threshold;

the network energy efficiency value being greater than a second preset threshold; and the network quality score being greater than a third preset threshold.

In one exemplary implementation of the present disclosure, the method further includes:

adding a new to-be-deployed wireless router in the spatial area and selecting another position for deploying the new to-be-deployed wireless router until a number of deployed wireless routers in the spatial area is greater than a fourth preset threshold.

According to one aspect of the present disclosure, there is provided a wireless router deployment device for determining deployment positions of wireless routers in one spatial area, the device including:

an information acquisition module configured to acquire first position information on a plurality of candidate nodes distributed in the spatial area for deploying the wireless routers;

a first calculation module configured to calculate, based on the first position information, a network coverage probability and a network energy efficiency value for each of the candidate nodes presuming a to-be-deployed wireless router is deployed at the candidate node;

a second calculation module configured to calculate network quality scores for respective candidate nodes according to the network coverage probability and the network energy efficiency value; and a position selection module configured to select a candidate node with the highest network quality score as a deployment position for the to-be-deployed wireless router.

According to one aspect of the present disclosure, there is provided computer readable storage medium having a computer program stored therein, the computer program is used for implementing any of the wireless router deployment method described above when being executed by a processor.

According to one aspect of the present disclosure, there is provided an electronic apparatus, including a processor and a memory for storing executable instructions of the processor, wherein the processor is configured to implement any of the wireless router deployment method described above by executing the executable instructions.

It should be understood that both the foregoing general description and the following detailed description are exemplary and explanatory only and are not restrictive of the present disclosure.

BRIEF DESCRIPTION OF THE DRAWINGS

The drawings herein, which are incorporated in and constitute a part of this specification, illustrate embodiments consistent with the present disclosure, and serve to explain the principles of the present disclosure together with the description. Understandably, the drawings in the following description are just some embodiments of the present disclosure. For those of ordinary skill in the art, other drawings may be obtained based on these drawings without creative efforts.

DETAILED DESCRIPTION

Example embodiments will now be described more fully with reference to the accompanying drawings. However, the example embodiments can be implemented in various forms and should not be construed as limited to the embodiments set forth herein; rather, these embodiments are provided so that this disclosure will be thorough and complete, and will fully convey the concept of the example embodiments to those skilled in the art. The described features, structures, or characteristics can be combined in one or more implementations in any suitable ways.

In addition, the drawings are merely schematic illustrations of the present disclosure and are not necessarily drawn to scale. The same reference numerals in the drawings denote the same or similar parts, and the repeated description thereof will be omitted. Some of the block diagrams shown in the drawings are functional entities and do not necessarily have to correspond to physically or logically separate entities. These functional entities can be implemented in a form of software, or implemented in one or more hardware modules or integrated circuits, or implemented in different networks and/or processor devices and/or microcontroller devices.

In an exemplary implementation of the present disclosure, a wireless router deployment method is first provided for determining deployment positions of wireless routers in one spatial area. Wireless network coverage within the spatial area may be achieved by deploying and installing the wireless routers according to the determined deployment positions. The spatial area in which the wireless routers are deployed may be a two-dimensional space such as a square or a park, and may also be a three-dimensional space such as an office building or other high-rise building, which is not specifically limited in the present disclosure.

Figure 1:
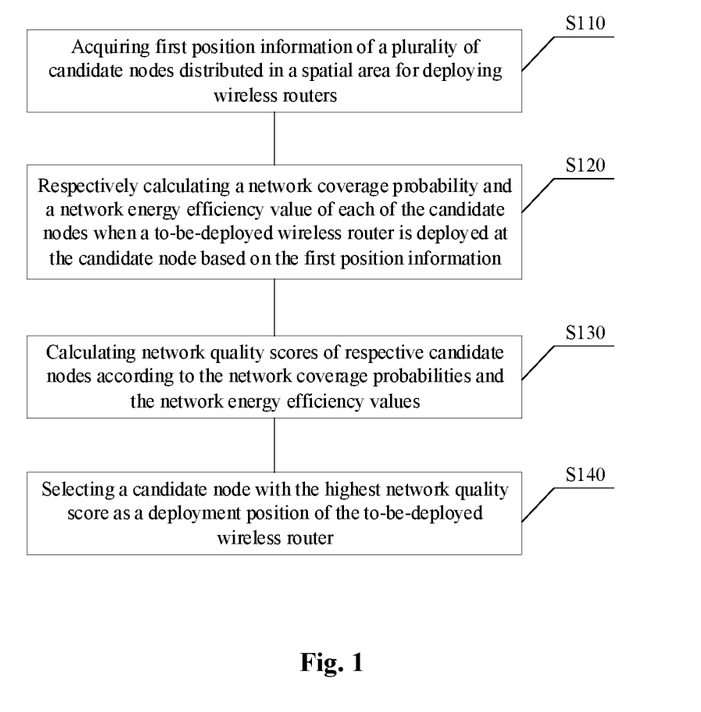
FIG. 1 is a flow chart schematically illustrating steps of a wireless router deployment method in one exemplary implementation of the present disclosure.

As shown in FIG. 1, a wireless router deployment method provided in the exemplary implementation may mainly include steps S110 to S140.

In step S110, first position information of a plurality of candidate nodes distributed in a spatial area for deploying wireless routers is acquired.

There are a plurality of candidate nodes distributed in a spatial area where wireless routers need to be deployed, and the number of candidate nodes should be greater than or equal to the maximum number of wireless routers that need to be deployed, so as to be able to provide sufficient wireless router deployment positions. Each of the candidate nodes may be a position node randomly selected in the spatial area, or may be also a position node selected according to a predetermined rule. Based on the area range and size information of the entire spatial area, the exact position of each candidate node may be determined. In one embodiment, this step may create a simulation model for the entire spatial area and the candidate nodes in the space, and accordingly, a two-dimensional coordinate system or a three-dimensional coordinate system may be established. Coordinate values of respective candidate nodes in the coordinate system are obtained to be used as the first position information.

In step S120, network coverage probability and network energy efficiency value of each of the candidate nodes when a to-be-deployed wireless router is deployed at the candidate node are respectively calculated based on the first position information.

Based on the first position information of respective candidate nodes acquired in step S110, in step S120, a to-be-deployed wireless router (i.e., one of the wireless routers that is to-be-deployed) can be sequentially deployed at each of the candidate nodes, and then two evaluation parameters including network coverage probability and network energy efficiency value for each of the candidate nodes can be calculated at the current deployment state. Since distributed positions of respective candidate nodes are different, degrees of the network coverage in the overall spatial area may be different when a to-be-deployed wireless router is deployed at different candidate nodes. Moreover, when a plurality of wireless routers are deployed in the spatial area, there may be interference of network communication among them, which also affects the degrees of the network coverage. The network coverage probability calculated in this step can be used to evaluate the degree of the network coverage in the spatial area. In addition, when the plurality of wireless routers are deployed at positions relatively close to one another, there will be a certain degree of overlapping in the network coverage, and the larger the overlapping range, the lower the utilization efficiency of transmission power of all the wireless routers in the entire spatial area is. The network energy efficiency value calculated in this step can be used to evaluate the network utilization efficiency in the spatial area.

In step S130, network quality scores of respective candidate nodes are calculated according to the network coverage probabilities and the network energy efficiency values.

A plurality of sets of network coverage probabilities and network energy efficiency values corresponding to the plurality of candidate nodes are calculated in step S120, and based on the calculation, a network quality score of each of the candidate nodes can be calculated in step S130. In general, the network quality score is positively correlated with the network coverage probability, and the network quality score is also positively correlated with the network energy efficiency value. When the network coverage probability and the network energy efficiency value at some candidate node are higher, the network quality score of the candidate node is also generally higher, which means that a priority of one to-be-deployed wireless router at the candidate node can also be relatively higher.

In step S140, a candidate node with the highest network quality score is selected as a deployment position of the to-be-deployed wireless router.

The network quality scores of the candidate nodes in the spatial area can be obtained according to the calculation of step S130. After comparison, one of the candidate nodes with the highest network quality score can be selected as a deployment position of the to-be-deployed wireless router in step S140, that is, the to-be-deployed wireless router can be deployed at the candidate node with the highest network quality score.

In the wireless router deployment method provided by in the exemplary implementation, the network quality scores of respective candidate nodes may be further calculated by calculating the network coverage probability and the network energy efficiency value of each candidate node, thereby callable of providing an evidence for the deployment positions of the wireless routers. The deployment method takes into account the degree of network coverage and the network utilization efficiency in the spatial area, thereby capable of avoiding waste of network resources and reducing deployment cost of network equipment while achieving high coverage of the overall space wireless network and ensuring network communication quality.

Figure 2:
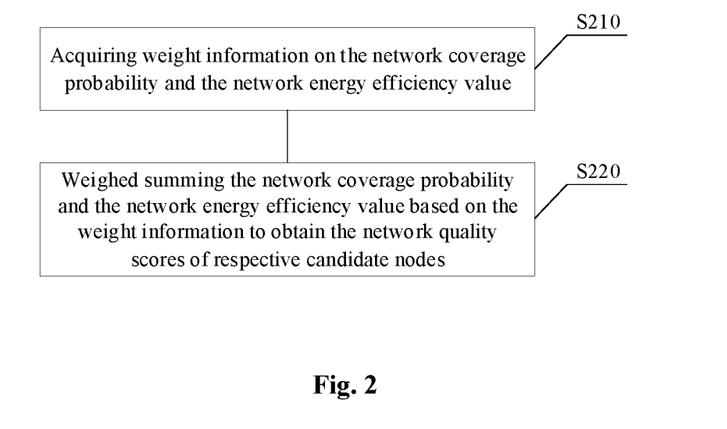
FIG. 2 is a flow chart schematically illustrating partial steps of a wireless router deployment method in another exemplary implementation of the present disclosure.

As shown in FIG. 2, in another exemplary implementation of the present disclosure, step S130 of calculating network quality scores of respective candidate nodes according to the network coverage probabilities and the network energy efficiency values may further include steps S210 and S220.

In step S210, weight information on the network coverage probability and network energy efficiency value is acquired.

In order to reasonably evaluate the network quality of each candidate node, this step may obtain weight information on the two evaluation parameters including network coverage probability and network energy efficiency value at first. The weight information can be set and adjusted according to specific network deployment requirements of a user in the spatial area.

In step S220, the network coverage probability and the network energy efficiency value are weighted summed based on the weight information to obtain the network quality scores of respective candidate nodes.

Based on the weight information acquired in step S210, in step S220, the network coverage probabilities and the network energy efficiency values of respective candidate nodes are respectively weighted summed, and the respective summed results are used as the network quality scores of respective candidate nodes.

In the embodiment of the present invention, different weighting coefficients may be allocated for the network coverage probabilities and the network energy efficiency values by means of obtaining the weight information, so that a ratio of the two parameters in the network quality score can be controlled. Different ratios also reflect the importance of the parameters considered in deploying wireless routers, and can provide more diversified options for schemes of deploying wireless routers.

Figure 3:
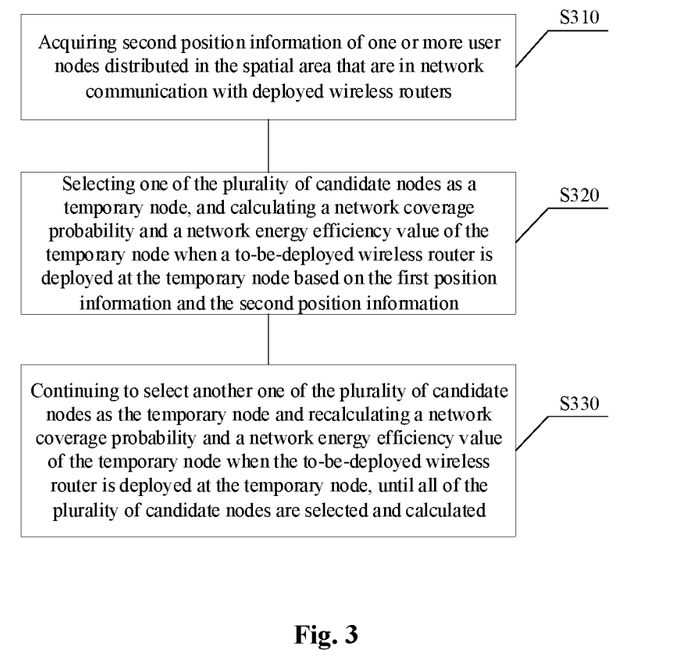
FIG. 3 is a flow chart schematically illustrating partial steps of a wireless router deployment method in another exemplary implementation of the present disclosure.

As shown in FIG. 3, in another exemplary implementation of the present disclosure, step S120 of respectively calculating the network coverage probability and the network energy efficiency value of each of the candidate nodes when a to-be-deployed wireless router is deployed at the candidate node based on the first position information may further include steps S310 to S330.

In step S310, second position information of one or more user nodes distributed in the spatial area that are in network communication with deployed wireless routers is acquired.

At least one user node is also distributed in the spatial area where wireless router(s) needs to be deployed, and each user node may be a position node randomly selected in the spatial area, or may also be a position node selected according to a predetermined rule. If the user node is a position node randomly distributed in the spatial area, a wireless network usage close to a real environment can be simulated. Based on the area range and size information of the entire spatial area, the exact position of each user node can be determined. In one embodiment, in this step, a coordinate value of each user node in the coordinate system can be used as the second position information based on a two-dimensional coordinate system or a three-dimensional coordinate system. For convenience of calculation, the second position information in this step and the first position information in step S110 should be acquired based on the same coordinate system.

In step S320, one of the plurality of candidate nodes is selected as a temporary node, and a network coverage probability and a network energy efficiency value of the temporary node when a to-be-deployed wireless router is deployed at the temporary node are calculated based on the first position information and the second position information.

For the plurality of candidate nodes in the spatial area, in this step, one of them is firstly selected as a temporary node, and the network coverage probability and the network energy efficiency value of the temporary node when a to-be-deployed wireless router is deployed at the temporary node can be calculated by using the first position information of each candidate node and the second position information of each user node. The first position information of respective candidate nodes includes first position information of the candidate nodes of the deployed wireless router in addition to the first position information of the selected temporary node. In this calculation process, each of the user nodes can be connected to corresponding one having the highest power among the wireless routers that can be selected, so that the real best communication effect can be simulated.

In step S330, another one of the plurality of candidate nodes is continued to be selected as the temporary node, and a network coverage probability and a network energy efficiency value of the temporary node when a to-be-deployed wireless router is deployed at the temporary node is recalculated, until all of the plurality of candidate nodes are selected and calculated.

After completing the calculation of one temporary node in step S320, in step S330, others of the plurality of candidate nodes are continued to be selected as the temporary node, and the network coverage probability and the network energy efficiency thereof are recalculated when a to-be-deployed wireless router is deployed at the new temporary node. This step repeats this process until completing the selection and calculation of all candidate nodes.

In the exemplary implementation, respective network coverage probabilities and network energy efficiency values of the candidate nodes when a to-be-deployed wireless router is respectively deployed at the candidate nodes can be sequentially calculated by selecting the candidate nodes one by one.

Figure 4:
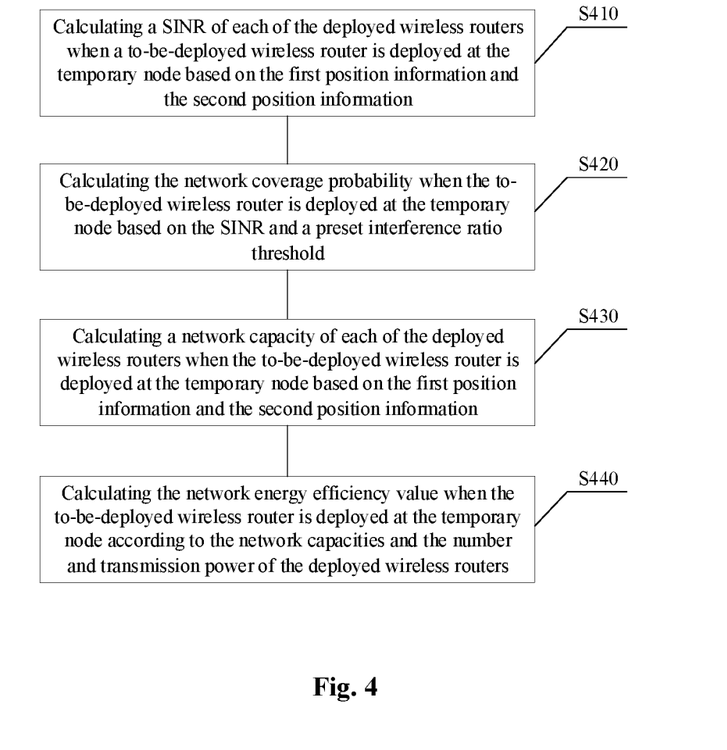
FIG. 4 is a flow chart schematically illustrating partial steps of a wireless router deployment method in another exemplary implementation of the present disclosure.

As shown in FIG. 4, on the basis of the above exemplary implementations, step S320 of calculating the network coverage probability and the network energy efficiency value of the temporary node when a to-be-deployed wireless router is deployed at the temporary node based on the first position information and the second position information may further include steps S410 to S440.

In step S410, a SINR of each of the deployed wireless routers when a to-be-deployed wireless router is deployed at the temporary node is calculated based on the first position information and the second position information.

Based on the first position information of respective candidate nodes and the second position information of respective user nodes, in step S410, at first, a SINR of each of the deployed wireless routers when a to-be-deployed wireless router is deployed at the temporary node can be calculated, wherein the SINR can reflect a ratio of the strength of the received useful signal to a sum of the strength of the received noise signal and the strength of the interference signal.

In step S420, the network coverage probability when a to-be-deployed wireless router is deployed at the temporary node is calculated based on the SINR and a preset interference ratio threshold.

By using the SINR calculated in step S410 and the preset interference ratio threshold, in step S410, the network coverage probability when the to-be-deployed wireless router is deployed at the temporary node can be calculated, and the calculating can be specifically carried out by adopting a calculation formula provided in other parts of the present disclosure or an existing calculation formula in the related art, and is not specially limited thereto in the exemplary implementation.

In step S430, a network capacity of each of the deployed wireless routers when the to-be-deployed wireless router is deployed at the temporary node is calculated based on the first position information and the second position information.

Based on the first position information of respective candidate nodes and the second position information of respective user nodes, in step S430, network capacity of each of the deployed wireless routers when the to-be-deployed wireless router is deployed at the temporary node can be calculated, and a network capacity may reflect an effective power supplied by a wireless router to a user node.

In step S440, the network energy efficiency value when the to-be-deployed wireless router is deployed at the temporary node is calculated according to the network capacities and the number and transmission power of the deployed wireless routers.

Using the network capacities of respective deployed wireless routers calculated in step S430, and the number and transmission power of the deployed wireless router in the entire spatial area, in step S440, the network energy efficiency value when the to-be-deployed wireless router is deployed at the temporary node can be calculated. A transmission power of a wireless router can be an ideal transmitted power, or can be a loss transmission power based on a loss of a router component, and is not specially limited thereto in the exemplary implementation.

Figure 5:
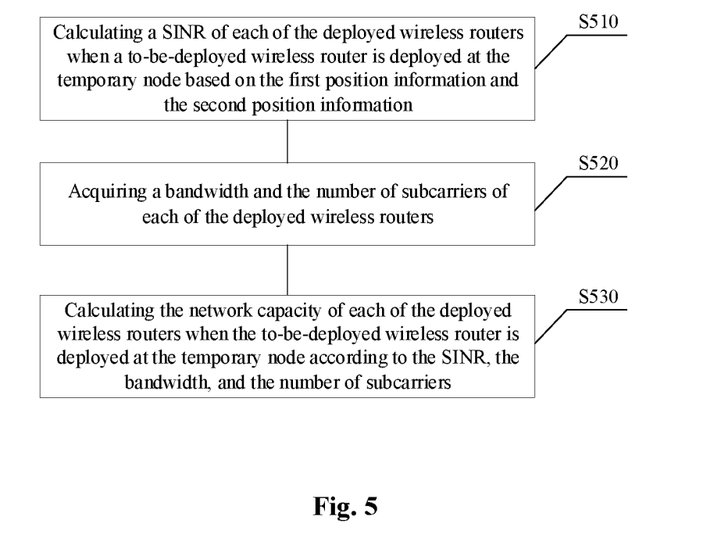
FIG. 5 is a flow chart schematically illustrating partial steps of a wireless router deployment method in another exemplary implementation of the present disclosure.

As shown in FIG. 5, based on the above exemplary implementations, step S430 of calculating the network capacity of each of the deployed wireless routers when the to-be-deployed wireless router is deployed at the temporary node based on the first position information and the second position information may further include steps S510 to S530.

In step S510, a SINR of each of the deployed wireless routers when the to-be-deployed wireless router is deployed at the temporary node is calculated based on the first position information and the second position information.

This step can obtain a SINR of each of the deployed wireless routers by directly using the calculation result of step S410, and can also calculate a SINR of each of the deployed wireless routers by using a calculation method different from step S410.

In step S520, a bandwidth and the number of subcarriers of each of the deployed wireless routers are acquired.

There may be a plurality of deployed wireless routers in a spatial area. When a to-be-deployed wireless router is deployed on a temporary node, the to-be-deployed wireless router is used as one of the deployed wireless routers for related calculation. In this step, information such as a bandwidth and the number of subcarriers of each of the deployed wireless routers is acquired for subsequent calculation.

In step S530, the network capacity of each of the deployed wireless routers when the to-be-deployed wireless router is deployed at the temporary node according to the SINR, the bandwidth, and the number of subcarriers.

Based on the SINR calculated in step S510 and the number of bandwidths and subcarriers acquired in step S520, in step S530, the network capacity of each of the deployed wireless routers when the to-be-deployed wireless router is deployed at the temporary node can be calculated, and the calculating can be specifically carried out by adopting a calculation formula provided in other parts of the present disclosure or an existing calculation formula in the prior art, and is not specially limited thereto in the exemplary implementation.

The exemplary implementation provides a method for calculating a network coverage probability and a network energy efficiency value when a to-be-deployed wireless router is deployed at a temporary node, and portions thereof not described in detail can refer to other parts of the present disclosure or can refer to a network communication technology of a wireless router involved in the prior art.

Figure 6:
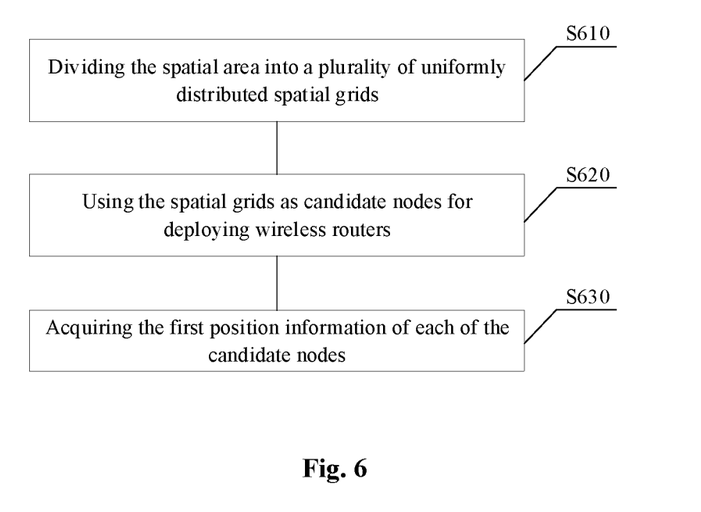
FIG. 6 is a flow chart schematically illustrating partial steps of a wireless router deployment method in another exemplary implementation of the present disclosure.

In order to accurately identify positions of candidate nodes, the present disclosure can model a spatial area where wireless routers needs to be deployed. Taking a three-dimensional spatial area as an example, a three-dimensional model can be established. As shown in FIG. 6, in another exemplary implementation of the present disclosure, step S110 of acquiring first position information of a plurality of candidate nodes distributed in the spatial area for deploying the wireless routers may further include steps S610 to S630.

In step S610, the spatial area is divided into a plurality of uniformly distributed spatial grids.

In step S610, the entire spatial area can be divided into regions to obtain the plurality of uniformly distributed spatial grids, and the specific divided results can also be adjusted in conjunction with an internal pattern and configuration of the spatial area.

In step S620, the spatial grids are used as candidate nodes for deploying wireless routers.

The plurality of spatial grids divided in step S610 can be used as candidate nodes for deploying wireless routers. During subsequent simulation calculation, to-be-deployed wireless routers can be sequentially deployed in a preset order in respective wireless routers that have not been deployed in the space grids. In general, at each of the spatial grids or candidate nodes, only one wireless router can be deployed.

In step S630, the first position information of each of the candidate nodes is acquired.

After the spatial area is divided in step S610, each of the spatial grids can be used as a candidate node to obtain respective corresponding position coordinate in a coordinate system, and position coordinates are the first position information of respective candidate nodes.

The above exemplary implementations describe a process of deploying a to-be-deployed wireless router in detail, and more than one wireless router is generally needed in one relatively large spatial area. Especially in high-rise buildings such as office buildings, there are more wireless routers that needed to be deployed. Therefore, after completing selecting a deployment position of a to-be-deployed wireless router (that is, completing the deployment) by the wireless router deployment method provided in the above exemplary implementations, the following step may be further included: continuing to deploy a new to-be-deployed wireless router in the spatial area and reselecting a deployment position for the new to-be-deployed wireless router until the network coverage probability, network energy efficiency value, and/or network quality score meet preset conditions. The preset conditions may include that the network coverage probability is greater than a first preset threshold, the network energy efficiency value is greater than a second preset threshold, and the network quality score is greater than a third preset threshold. Specific preset conditions can be set according to actual deployment requirements.

Whenever it is necessary to continue to increase deployment of a new wireless router in a spatial area, since the number of deployed wireless routers in the spatial area changes (that is, one is added based on the number of original routers), the relevant parameters obtained in the previous calculation are no longer suitable, and thus need to be recalculated.

By adopting a network coverage probability being greater than a first preset threshold as a preset condition, it is assumed that there are T temporary nodes in a spatial area. When a first wireless router is deployed, the first wireless router can be deployed at the T temporary nodes in sequence, and after relevant parameters thereof are respectively calculated, an optimal node is determined to complete the deployment, and at the same time, an overall network coverage probability of the spatial area is $P_1$.

When a second wireless router is deployed, the second wireless router needs to be deployed in the remaining (T-1) temporary nodes in sequence, and a new optimal node is determined through joint calculation based on the deployment of the first and second wireless routers, and a new network coverage probability $P_2$ is thus obtained. In this way, assuming that four wireless routers have been deployed in the spatial area according to the above deployment method, T+(T-1)+(T-2)+(T-3) calculations are required so that deployment positions of each of the four wireless routers can be determined in sequence. Based on the deployment method, a new wireless router is continuously deployed in the spatial area until the calculated network coverage probability is greater than the first preset threshold, so that the wireless router deployment in the entire spatial area can be completed.

In addition to the above, during deploying a plurality of wireless routers, the wireless router deployment method provided in the above exemplary implementation may further include the following step: adding a new to-be-deployed wireless router in the spatial area and reselecting a position for deploying the to-be-deployed wireless router until the number of deployed wireless routers in the spatial area is greater than a fourth preset threshold. This step is equivalent to presetting the maximum number of wireless routers in the entire spatial area to be the fourth preset threshold, and when the number is not reached, it is necessary to continuously increase the deployment of new wireless routers in the spatial area.

It should be noted that although the above exemplary implementations describe respective steps of the method in the present disclosure in a specific order, this does not require or imply that these steps must be performed in the specific order, or that all steps must be performed to achieve a desired result. Additionally or alternatively, certain steps can be omitted, multiple steps can be combined into one step to be carried out, and/or one step can be decomposed into multiple steps to be carried out and the like.

The wireless router deployment in the above exemplary implementations will be described in detail below in conjunction with a specific application scenario.

Figure 7:
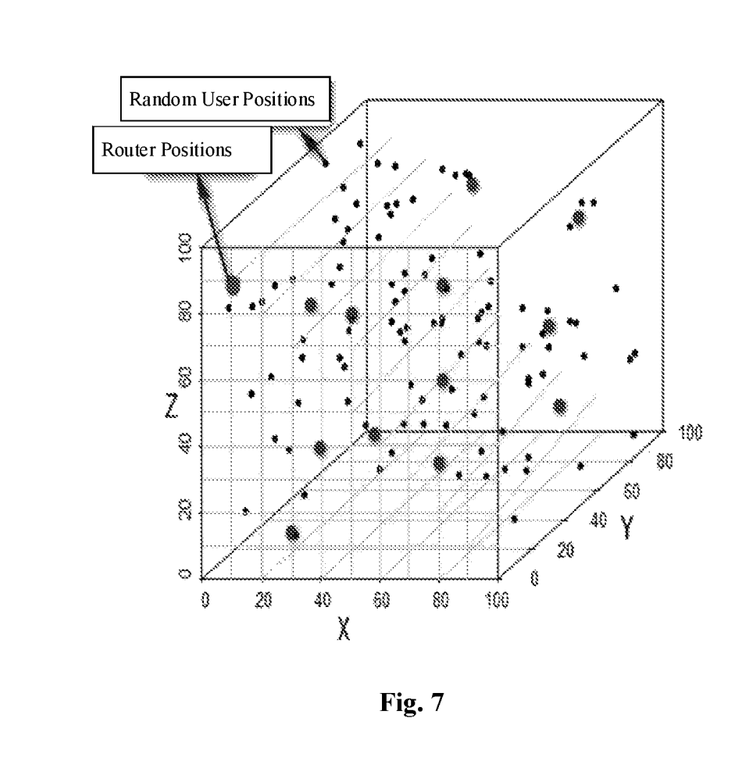
FIG. 7 is a schematic diagram of an application scenario of a wireless router deployment method in one exemplary implementation of the present disclosure.

As shown in FIG. 7, in a communication network, it is assumed that a wireless network of a three-dimensional area contains a large number of routers (represented by dots having a relatively large size in the drawing), and that n users (represented by dots having a relatively small size in the drawing) are randomly distributed in the area to communicate with the routers in the area. Let a user set be $U=\{u_1, u_2, \ldots, u_n\}$, a router set in the area be $\Phi=\{i_1, i_2, \ldots, i_k\}$, corresponding coordinates of the routers be $Z=\{z_1, z_2, \ldots, z_k\}$, a coordinate of a user expressed as $z_u$, a router subcarrier transmission power be $P_i^{(n)}$, and a path loss factor be $\alpha$. In this application scenario, the path loss factor $\alpha$ can be set to be 4 ($\alpha=4$), and $\sigma^2$ represents a subcarrier thermal noise effect of each router. Accordingly, the signal to noise and interference plus noise ratio (SINR) between a router k and a user can be expressed as:

$$SINR_u^{(n)} = \frac{P_k^{(n)}|z_u - z_k|^{-\alpha}}{\sum_{i \in \Phi, i \neq k} P_i^{(n)}|z_u - z_i|^{-\alpha} + \sigma^2}.$$

In this application scenario, signal power sent by routers can be set to be the same, and users receive different router powers as the users have different distances from the routers, so that it can be achieved through programming that the users select to communicate with the optimal power router. A network capacity $C(u, \Phi)$ of a user to a router can be expressed as:

$$C(u, \Phi) = \sum_{n=1}^{N_u} W_u^{(n)} \log_2(1 + SINR_u^{(n)}).$$

$SINR_u^{(n)}$ represents a SINR between a router k and a user, $N_u$ is the number of subcarriers assigned to the user by the router, and $W_u^{(n)}$ represents a bandwidth of a subcarrier n of a router. Based on a comparison table of bandwidths and subcarriers of a system, the bandwidths and the number of subcarriers of the router system can be obtained.

The entire system can have an energy efficiency expressed as:

$$\eta_E(\Phi) = \frac{\sum_{u \in U} C(u, \Phi)}{N_B \cdot P_{ma}}.$$

$N_B$ represents the number of routers, and $P_{ma}$ represents a loss power of a router. In calculating the actual energy efficiency, a power loss problem of a router needs to be considered. Not only power consumption of the router exists in signal transmission, but also losses of components in the routers cannot be neglected. There is a linear relationship between average power consumption of the routers and radiated power of the routers. The power consumption model can be expressed as:

$$P_{ma} = \alpha_m \cdot P_T + B_m.$$

$P_T$ represents an ideal transmission power of a router; the coefficient $\alpha_m$ represents a loss factor of average radiated power loss caused by losses of an amplifier and a feeder and site cooling; $B_m$ represents a power deviation, which is a parameter independent of transmission power magnitude and power consumption.

The coverage probability is expressed as:

$$P_C(T) = E[P\{SINR \geq T|r\}] = \int_0^R P\{h_0 > T(\sigma_n^2 + I)r^\alpha\} f(r) dr.$$

T is a predefined SINR threshold, r is a distance of a user from a router, R is a distance range of users from routers for integration, $h_0$ is a Nakagami-m channel gain, $\sigma_n^2$ is normalized noise power, I is the interference, a is a path loss parameter, and f(r) is a probability density function of distances between target users and the nearest base stations.

The algorithm involved in the application scenario uses a top-down iteration method to make the optimal selection. Each time a selection is made, the problem obtained is divided into independent sub-problems, and determining the current problem solving process during selecting the sub-problems is only related to the current state without interfering or affecting the solving of other sub-problems. The solving of each sub-problem is independent of one another. The local optimal solution can be finally combined into the overall optimal solution, which is the applicable premise of the algorithm when solving the problem. After the sub-problems are all solved, a mathematical induction method is used to prove that the final overall solution is the optimal solution.

The algorithm design rule is as follows: a three-dimensional to-be-tested area is divided into m×m×m grids, with N=m³ grid points in total, X user points are randomly scattered in the to-be-tested area; a first router is deployed at the m³ grid points in sequence, and a position of a maximum value of a network quality score thereof related to a network coverage probability and a network energy efficiency value is obtained, so that the first router is placed at the position; then a second router is placed in the remaining (m³−1) grid points, a position of a maximum value of a network quality score thereof is obtained, so that the second router is placed at the position; and respective wireless routers are sequentially placed and deployed in this way. When a predetermined coverage probability value P is realized in the three-dimensional to-be-tested area, that is, $P_C(T) > P$, and the network energy efficiency value TIE exceeds a predetermined value η, a router profile is obtained to achieve a balance between the maximum coverage volume and the best communication quality.

Figure 8:
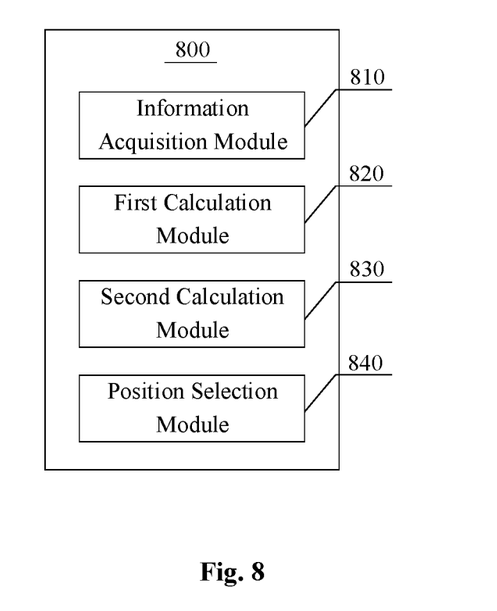
FIG. 8 is a block diagram schematically illustrating a configuration of a wireless router deployment device in an exemplary implementation of the present disclosure.

In an exemplary implementation of the present disclosure, there is also provided a wireless router deployment device that can be used to determine a deployment position of a wireless router in one spatial area. As shown in FIG. 8, a wireless router deployment device 800 may mainly include an information acquisition module 810, a first calculation module 820, a second calculation module 830, and a position selection module 840. The information acquisition module 810 is configured to acquire first position information of a plurality of candidate nodes distributed in the spatial area for deploying wireless routers; the first calculation module 820 is configured to respectively calculate a network coverage probability and a network energy efficiency value of each of the candidate nodes when a to-be-deployed wireless router is deployed at the candidate node based on the first position information; the second calculation module 830 is configured to calculate network quality scores of respective candidate nodes according to the network coverage probabilities and the network energy efficiency values; and the position selection module 840 is configured to select a candidate node with the highest network quality score as a deployment position of the to-be-deployed wireless router.

In another exemplary implementation of the present disclosure, the second calculation module 830 may further include a weight acquisition module and a score calculation module. The weight acquisition module is configured to acquire weight information on the network coverage probability and the network energy efficiency value; and the score calculation module is configured to weighted sum the network coverage probability and the network energy efficiency value based on the weight information to obtain the network quality scores of respective candidate nodes.

In another exemplary implementation of the present disclosure, the first calculation module 820 may further include a position acquisition module, a first node calculation module, and a second node calculation module. The position acquisition module is configured to acquire second position information of one or more user nodes distributed in the spatial area that are in network communication with deployed wireless routers; the first node calculation module is configured to select one of the plurality of candidate nodes as a temporary node and calculate a network coverage probability and a network energy efficiency value of the temporary node when a to-be-deployed wireless router is deployed at the temporary node based on the first position information and the second position information; and the second node calculation module is configured to continue to select another one of the plurality of candidate nodes as the temporary node and recalculate a network coverage probability and a network energy efficiency value of the temporary node when the to-be-deployed wireless router is deployed at the temporary node, until all of the plurality of candidate nodes are selected and calculated.

In another exemplary implementation of the present disclosure, the first node calculation module may further include a SINR calculation module, a network coverage probability calculation module, a network capacity calculation module, and a network energy efficiency value calculation module. The SINR calculation module is configured to calculate a SINR of each of the deployed wireless routers when a to-be-deployed wireless router is deployed at the temporary node based on the first position information and the second position information; the network coverage probability calculation module is configured to calculate the network coverage probability when the to-be-deployed wireless router is deployed at the temporary node based on the SINR and a preset interference ratio threshold; the network capacity calculation module is configured to calculate a network capacity of each of the deployed wireless routers when the to-be-deployed wireless router is deployed at the temporary node based on the first position information and the second position information; and the network energy efficiency value calculation module is configured to calculate the network energy efficiency value when the to-be-deployed wireless router is deployed at the temporary node according to the network capacities and the number and transmission power of the deployed wireless routers.

In another exemplary implementation of the present disclosure, the information acquisition module 810 may further include a spatial area division module, a spatial grid selection module, and a node information acquisition module. The spatial area division module is configured to divide the spatial area into a plurality of uniformly distributed spatial grids; the spatial grid selection module is configured to use the spatial grids as candidate nodes for deploying the wireless router; and the node information acquiring module is configured to acquire the first position information of each of the candidate nodes.

Specific details of the above-mentioned wireless router deployment device have been described in detail in the corresponding wireless router deployment method, and thus will not be described herein.

It should be noted that although several modules or units of an apparatus for performing actions are mentioned in the detailed description above, such division is not mandatory. In actual, in accordance with implementations of the present disclosure, features and functions of two or more modules or units described above can be embodied in one module or unit. On the contrary, feature(s) and function(s) of one of the modules or units described above can be further divided into a plurality of modules or units to be embodied.

In an exemplary implementation of the present disclosure, there is also provided a computer readable storage medium having a computer program stored therein that, when executed by a processor, implements the above-described wireless router deployment method of the present disclosure. In some possible implementations, various aspects of the present disclosure may also be implemented in a form of a program product including program code, and the program product may be stored in a non-volatile storage medium (which may be a CD-ROM, a USB flash disk, a mobile hard disk or the like) or on a network; and when the program product is run in a computing apparatus (which may be a personal computer, a server, a terminal device, a network apparatus or the like), the program code is used to make the computing apparatus to execute steps in the methods of the above-mentioned exemplary implementations in the present disclosure.

Figure 9:
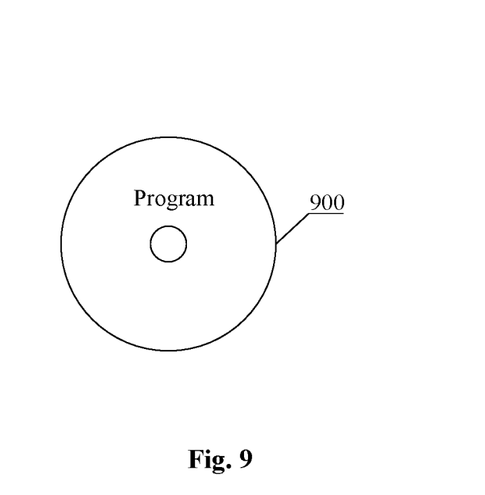
FIG. 9 is a schematic diagram schematically illustrating a program product in an exemplary implementation of the present disclosure.

Referring to FIG. 9, a program product 900 for implementing the above methods according to an implementation of the present disclosure is described. It may use portable compact disk read-only memory (CD-ROM) and include program code, and may run on a computing apparatus (which may be a personal computer, a server, a terminal device, a network apparatus or the like). However, the program product of the present disclosure is not limited thereto. In the present exemplary embodiment, a readable storage medium may be any tangible medium containing or storing a program, which may be used by or in combination with an instruction execution system, apparatus, or device.

The program product may employ any combination of one or more readable media. The readable medium may be a readable signal medium or a readable storage medium.

The readable storage medium may be, for example, but not limited to, an electrical, magnetic, optical, electromagnetic, infrared, or semiconductor system, apparatus, or device, or any combination thereof. More specific examples (non-exhaustive list) of the readable storage medium include electrical connections with one or more wires, a portable disk, a hard disk, random access memory (RAM), read only memory (ROM), erasable programmable read-only memory (EPROM or flash memory), optical fiber, portable compact disk read-only memory (CD-ROM), optical storage device, magnetic storage device, or any suitable combination thereof.

The readable signal medium may include a data signal that is propagated in baseband or as part of a carrier wave, carrying readable program code, in which readable program code is carried. The propagated data signal may take many forms, including but not limited to electromagnetic signals, optical signals, or any suitable combination thereof. The readable signal medium may also be any readable medium other than a readable storage medium, and may send, propagate, or transmit a program for use by or in combination with an instruction execution system, apparatus, or device.

The program code contained in the readable medium may be transmitted by means of any appropriate medium, including but not limited to wireless, wired, optical fiber cable, RF, etc., or any suitable combination thereof.

The program code for performing operations of the present disclosure may be written in any combination of one or more programming languages including object-oriented programming languages such as Java, C++, etc., as well as conventional procedural programming languages such as C language or similar programming language. The program code may be executed entirely in a user computing apparatus, partly in a user apparatus, as an independent software package, partly in a user computing apparatus and partly in a remote computing apparatus, or entirely in a remote computing apparatus or server. In the case of remote computing apparatus, the remote computing apparatus may be connected to a user computing apparatus by means of any kind of network, including a local area network (LAN) or wide area network (WAN), or may be connected to an external computing apparatus, for example, by means of the Internet by using Internet Service Provider (ISP).

In an exemplary implementation of the present disclosure, there is also provided an electronic apparatus including at least one processor configured to execute steps in the methods of the above-mentioned exemplary implementations in the present disclosure, and at least one memory for storing executable instructions of the processor.

An electronic apparatus 1000 in the present exemplary implementation will be described below with reference to FIG. 10. The electronic apparatus 1000 is merely an example and should not impose any limitation on the functions and scopes of use of the embodiments of the present disclosure.

Figure 10:
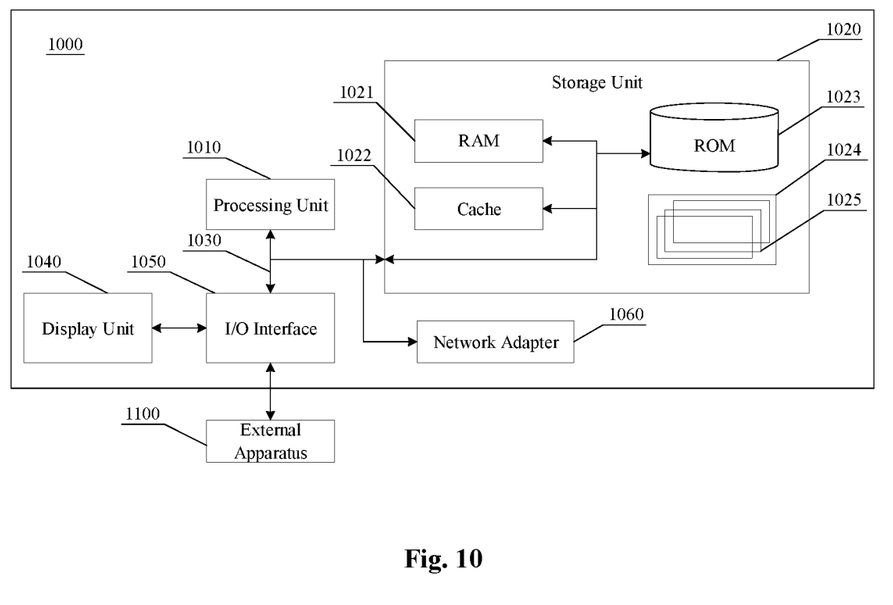
FIG. 10 is a modular schematic diagram schematically illustrating an electronic apparatus in an exemplary implementation of the present disclosure.

Referring to FIG. 10, the electronic apparatus 1000 is embodied in a form of a general purpose computing apparatus. The electronic apparatus 1000 may include components including, but not limited to, at least one processing unit 1010, at least one storage unit 1020, a bus 1030 that connects different system components (including the processing unit 1010 and the storage unit 1020), and a display unit 1040.

The storage unit 1020 stores program code therein, and the program code can be executed by the processing unit 1010 such that the processing unit 1010 performs the steps in the methods of the above-mentioned exemplary implementations in the present disclosure.

The storage unit 1020 may include a readable medium in a form of a volatile storage unit such as a random access memory (RAM) 1021 and/or a cache 1022, and may further include a read only memory (ROM) 1023.

The storage unit 1020 may also include a program/utility 1024 having a group of (at least one) program modules 1025, and such program modules include, but not limited to, an operating system, one or more applications, other program modules, and program data, of which each or some combination may include implementations of network environment.

The bus 1030 may be one or more of several types of bus structures, including a storage unit bus or storage unit controller, a peripheral bus, an accelerated graphics port, a processing unit, or a local area using any of various bus structures.

The electronic apparatus 1000 may also communicate with one or more external apparatuses 1100 (such as a keyboard, pointing device, Bluetooth device, etc.), and may further communicate with one or more apparatuses that enable a user to interact with the electronic apparatus 1000, and/or communicate with any apparatus (such as router, modem, etc.) that enables the electronic apparatus 1000 to communicate with one or more other computing apparatuses. Such communication may be made via an input/output (I/O) interface 1050. Also, the electronic apparatus 1000 can communicate with one or more networks (e.g., a local area network (LAN), a wide area network (WAN), and/or a public network such as the Internet) through a network adapter 1060. As shown in FIG. 10, the network adapter 1060 may communicate with other modules of the electronic apparatus 1000 via a bus 1030. It should be understood that although not shown in the drawing, the electronic apparatus 1000 may be used in combination with other hardware and/or software modules, including but not limited to microcode, a device driver, a redundant processing unit, an external disk drive array, a RAID system, a tape driver, a data backup storage system, and the like.

Those skilled in the art will appreciate that various aspects of the present disclosure can be implemented as a system, method, or program product. Accordingly, various aspects of the present disclosure may be specifically embodied in a form of a complete hardware implementation, a complete software implementation (including firmware, microcode, etc.), or an implementation of combining of hardware and software, which may be collectively referred to as "circuit", "module", or "system" herein.

Those skilled in the art may easily conceive of other implementations of the present disclosure after reading the specification and practicing the invention disclosed herein. The present application is intended to cover any variations, uses, or adaptive changes of the present disclosure, which are in accordance with the general principles of the present disclosure and include the common knowledge or commonly used technical means in the art that are not disclosed in the present disclosure. The specification and embodiments are regarded as illustrative only, and the true scope and spirit of the present disclosure are defined by the attached claims.

The features, structures, or characteristics described above may be combined in any suitable manner in one or more embodiments, and the features discussed in the various embodiments are interchangeable, if possible. In the description above, numerous specific details are set forth to provide a thorough understanding of the implementations of the present disclosure. However, those skilled in the art will appreciate that the technical solution of the present disclosure may be practiced without one or more of the specific details, or other methods, components, materials, and the like may be employed. In other instances, well-known structures, materials or operations are not shown or described in detail to avoid obscuring aspects of the present disclosure.

What is claimed is:

1. A wireless router deployment method for determining deployment positions of wireless routers in a spatial area, comprising:
    acquiring first position information on a plurality of candidate nodes distributed in the spatial area for deploying the wireless routers;
    determining, based on the first position information, a network coverage probability and a network energy efficiency value for each of the candidate nodes presuming a to-be-deployed wireless router is deployed at the candidate node;
    determining network quality scores for respective candidate nodes according to the network coverage probability and the network energy efficiency value; and
    selecting a candidate node with a highest network quality score as a deployment position for the to-be-deployed wireless router,
    wherein determining the network quality scores for the respective candidate nodes according to the network coverage probability and the network energy efficiency value comprises:
    acquiring weight information on the network coverage probability and the network energy efficiency value; and
    weighted summing the network coverage probability and the network energy efficiency value based on the weight information to obtain the network quality scores for the respective candidate nodes.

2. The wireless router deployment method according to claim 1, wherein determining, based on the first position information, the network coverage probability and the network energy efficiency value for each of the candidate nodes presuming a to-be-deployed wireless router is deployed at the candidate node comprises:
    acquiring second position information on one or more user nodes distributed in the spatial area that are in network communication with a deployed wireless router;
    selecting a temporary node from the plurality of candidate nodes, and determining, based on the first position information and the second position information, the network coverage probability and the network energy efficiency value for the temporary node presuming the to-be-deployed wireless router is deployed at the temporary node; and
    continuing to select another temporary node from the plurality of candidate nodes and determine the network coverage probability and the network energy efficiency value for the another temporary node presuming the to-be-deployed wireless router is deployed at the another temporary node, until all of the plurality of candidate nodes are selected and determined.

3. The wireless router deployment method according to claim 2, wherein the user nodes are randomly distributed in the spatial area.

4. The wireless router deployment method according to claim 2, wherein determining, based on the first position information and the second position information, the network coverage probability and the network energy efficiency value for the temporary node presuming the to-be-deployed wireless router is deployed at the temporary node comprises:
    determining, based on the first position information and the second position information, a signal to interference plus noise ratio (SINK) for the deployed wireless router presuming the to-be-deployed wireless router is deployed at the temporary node;
    determining, based on the SINR and a preset interference ratio threshold, the network coverage probability presuming the to-be-deployed wireless router is deployed at the temporary node;
    determining, based on the first position information and the second position information, a network capacity for the deployed wireless router presuming the to-be-deployed wireless router is deployed at the temporary node; and
    determining, according to the network capacity and a number and a transmission power of the deployed wireless router, the network energy efficiency value presuming the to-be-deployed wireless router is deployed at the temporary node.

5. The wireless router deployment method according to claim 4, wherein determining, based on the first position information and the second position information, the network capacity for the deployed wireless router presuming the to-be-deployed wireless router is deployed at the temporary node comprises:
    acquiring a bandwidth and a number of subcarriers for the deployed wireless router; and
    determining, according to the SINK, the bandwidth and the number of subcarriers, the network capacity for the deployed wireless router presuming the to-be-deployed wireless router is deployed at the temporary node.

6. The wireless router deployment method according to claim 5, wherein determining, according to the SINR, the bandwidth and the number of subcarriers, the network capacity for the deployed wireless router presuming the to-be-deployed wireless router is deployed at the temporary node comprises:
    determining the network capacity $C(u, \Phi)$ of a user to a router based on a following equation:

$$C(u, \Phi) = \sum_{n=1}^{N_u} W_u^{(n)} \log_2(1 + SINR_u^{(n)})$$

where $SINR_u^{(n)}$ is a SINR between a router k and a user, $N_u$ is a number of subcarriers assigned to the user by the router, and $W_u^{(n)}$ is a bandwidth of a subcarrier n of the router.

7. The wireless router deployment method according to claim 4, wherein determining, based on the first position information and the second position information, a SINR for the deployed wireless router presuming the to-be-deployed wireless router is deployed at the temporary node comprises:

determining the SINR between a router k and a user based on a following equation:

$$SINR_u^{(n)} = \frac{P_k^{(n)}|z_u - z_k|^{-\alpha}}{\sum_{i \in \Phi, i \neq k} P_i^{(n)}|z_u - z_i|^{-\alpha} + \sigma^2}$$

where $\Phi = \{i_1, i_2, \ldots, i_k\}$ is a router set, $z_u$ is a coordinate of the user, $P_i^{(n)}$ is a router subcarrier transmission power, $\alpha$, is a path loss factor, $\sigma^2$ is a subcarrier thermal noise effect of each router.

8. The wireless router deployment method according to claim 4, wherein determining, according to the network capacity and a number and a transmission power of the deployed wireless router, the network energy efficiency value presuming the to-be-deployed wireless router is deployed at the temporary node comprises:

determining the network energy efficiency value based on the following equations:

$$\eta_E(\Phi) = \frac{\sum_{u \in U} C(u, \Phi)}{N_B \cdot P_{ma}}$$

$$P_{ma} = \alpha_m \cdot P_T + B_m$$

where $C(u, \Phi)$ is the network capacity of a user to a router, $N_B$ is the number of routers, $P_{ma}$ is a loss power of a router, $P_T$ is an ideal transmission power of the router, $a_m$ is a loss factor of average radiated power loss caused by losses of an amplifier and a feeder and site cooling, $B_m$ is a power deviation.

9. The wireless router deployment method according to claim 1, wherein acquiring of the first position information on the plurality of candidate nodes distributed in the spatial area for deploying the wireless router comprises:

dividing the spatial area into a plurality of uniformly distributed spatial grids;

using the spatial grids as the candidate nodes for deploying the wireless router; and acquiring the first position information on each of the candidate nodes.

10. The wireless router deployment method according to claim 1, further comprising: continuing to deploy another to-be-deployed wireless router in the spatial area and select a deployment position for the another to-be-deployed wireless router until at least one of the network coverage probability, the network energy efficiency value, and a respective network quality score meets a preset condition.

11. The wireless router deployment method according to claim 1, wherein determining, based on the first position information, the network coverage probability for each of the candidate nodes presuming a to-be-deployed wireless router is deployed at the candidate node comprises:

determining the network coverage probability based on a following equation:

$$P_C(T) = E[P\{SINR \geq T|r\}] = \int_0^R P\{h_0 > T(\sigma_n^2 + I)r^\alpha\} f(r) dr$$

where T is a predefined SINR threshold, r is a distance of a user from a router, R is a distance range of users from routers for integration, $h_0$ is a Nakagami-m channel gain, $\sigma_n^2$ is normalized noise power, I is an interference, a is a path loss parameter, and f(r) is a probability density function of distances between the user and a nearest base station.

12. A non-transitory computer-readable storage medium having program instructions stored thereon that, when executed by at least one hardware processor, direct the at least one hardware processor to perform a method comprising:

acquiring first position information on a plurality of candidate nodes distributed in the spatial area for deploying the wireless routers;

determining, based on the first position information, a network coverage probability and a network energy efficiency value for each of the candidate nodes presuming a to-be-deployed wireless router is deployed at the candidate node;

determining network quality scores for respective candidate nodes according to the network coverage probability and the network energy efficiency value; and selecting a candidate node with a highest network quality score as a deployment position for the to-be-deployed wireless router, wherein determining the network quality scores for the respective candidate nodes according to the network coverage probability and the network energy efficiency value comprises:

acquiring weight information on the network coverage probability and the network energy efficiency value; and weighted summing the network coverage probability and the network energy efficiency value based on the weight information to obtain the network quality scores for the respective candidate nodes.

13. An electronic apparatus for determining deployment positions of wireless routers in a spatial area, comprising:

at least one hardware processor; and program instructions stored in memory and executable by the at least one hardware processor that, when executed, direct the at least one hardware processor to:

acquire first position information on a plurality of candidate nodes distributed in the spatial area for deploying the wireless routers;

determine, based on the first position information, a network coverage probability and a network energy efficiency value for each of the candidate nodes presuming a to-be-deployed wireless router is deployed at the candidate node;

determine network quality scores for respective candidate nodes according to the network coverage probability and the network energy efficiency value; and select a candidate node with a highest network quality score as a deployment position for the to-be-deployed wireless router, wherein the at least one hardware processor is further directed to:

acquire weight information on the network coverage probability and the network energy efficiency value; and weighted sum the network coverage probability and the network energy efficiency value based on the weight information to obtain the network quality scores for the respective candidate nodes.

14. The electronic apparatus according to claim 13, where the at least one hardware processor is further directed to:

acquire second position information on one or more user nodes distributed in the spatial area that are in network communication with a deployed wireless router;

select a temporary node from the plurality of candidate nodes, and determining, based on the first position information and the second position information, the network coverage probability and the network energy efficiency value for the temporary node presuming the to-be-deployed wireless router is deployed at the temporary node; and continue to select another temporary node from the plurality of candidate nodes and determine the network coverage probability and the network energy efficiency value for the another temporary node presuming the to-be-deployed wireless router is deployed at the another temporary node, until all of the plurality of candidate nodes are selected and determined.

15. The electronic apparatus according to claim 14, wherein the user nodes are randomly distributed in the spatial area.

16. The electronic apparatus according to claim 14, where the at least one hardware processor is further directed to:

determine, based on the first position information and the second position information, a signal to interference plus noise ratio (SINR) for the deployed wireless router presuming the to-be-deployed wireless router is deployed at the temporary node;

determine, based on the SINR and a preset interference ratio threshold, the network coverage probability presuming the to-be-deployed wireless router is deployed at the temporary node;

determine, based on the first position information and the second position information, a network capacity for the deployed wireless router presuming the to-be-deployed wireless router is deployed at the temporary node; and determine, according to the network capacity and a number and a transmission power of the deployed wireless router, the network energy efficiency value presuming the to-be-deployed wireless router is deployed at the temporary node.

17. The electronic apparatus according to claim 16, where the at least one hardware processor is further directed to:

acquire a bandwidth and a number of subcarriers for the deployed wireless router; and determine, according to the SINR, the bandwidth and the number of subcarriers, the network capacity for the deployed wireless router presuming the to-be-deployed wireless router is deployed at the temporary node.

18. The electronic apparatus according to claim 13, where the at least one hardware processor is further directed to:

divide the spatial area into a plurality of uniformly distributed spatial grids;

use the spatial grids as the candidate nodes for deploying the wireless router; and acquire the first position information on each of the candidate nodes.

* * * * *